United States Patent
Arimitsu et al.

(10) Patent No.: US 11,383,334 B2
(45) Date of Patent: Jul. 12, 2022

(54) TIGHTENING DEVICE

(71) Applicant: Honda Motor Co., Ltd., Tokyo (JP)

(72) Inventors: Takeshi Arimitsu, Tochigi (JP);
Tomohisa Katayama, Tochigi (JP);
Hironari Watanabe, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/218,191

(22) Filed: Mar. 31, 2021

(65) Prior Publication Data
US 2021/0299804 A1 Sep. 30, 2021

(30) Foreign Application Priority Data
Mar. 31, 2020 (JP) .............................. JP2020-064298

(51) Int. Cl.
| | |
|---|---|
| *B23P 19/06* | (2006.01) |
| *B25B 23/10* | (2006.01) |
| *B25B 23/12* | (2006.01) |
| *B25J 15/00* | (2006.01) |

(52) U.S. Cl.
CPC .............. *B23P 19/06* (2013.01); *B25B 23/10* (2013.01); *B25B 23/108* (2013.01); *B25B 23/12* (2013.01); *B25J 15/0019* (2013.01)

(58) Field of Classification Search
CPC ....... B25B 23/108; B25B 23/12; B25B 23/08; B25B 23/10; B25B 23/105; B25B 23/0057; B25B 21/00; B23P 19/006; B23P 19/06–061; B23P 19/069
See application file for complete search history.

(56) References Cited

U.S. PATENT DOCUMENTS

| | | | | |
|---|---|---|---|---|
| 3,368,431 A | * | 2/1968 | Kulaga | B25B 23/10 81/54 |
| 3,965,950 A | * | 6/1976 | MacDonald | B25B 23/10 81/455 |
| 5,088,359 A | * | 2/1992 | Hockman | B23P 19/006 81/433 |
| 6,314,845 B1 | * | 11/2001 | Wu | B23P 19/006 81/454 |
| 7,234,376 B2 | * | 6/2007 | Bader | B23P 19/006 269/233 |
| 7,752,946 B2 | * | 7/2010 | Wang | B25B 13/10 81/125 |

(Continued)

FOREIGN PATENT DOCUMENTS

| | | | | |
|---|---|---|---|---|
| JP | 61109632 A | * | 5/1986 | B23P 19/006 |
| WO | 2019150726 | | 8/2019 | |

*Primary Examiner* — Matthew P Travers
(74) *Attorney, Agent, or Firm* — JCIPRNET

(57) ABSTRACT

Provided is a tightening device capable of capturing a change in a contact state of a member to be tightened, such as a bolt or the like, and also performing fastening. The tightening device tightens a bolt to a work piece in a state where a main body is engaged with the bolt, and includes: a magnet that holds the bolt with respect to the main body; and at least one lower cam member that enables fixation in a fixed state where a binding force on the bolt is larger than a holding force of holding the bolt by the magnet. The at least one lower cam member is capable of maintaining the fixed state before a tightening work of tightening the bolt to the work piece is performed and releasing the fixed state after the tightening work is started.

1 Claim, 5 Drawing Sheets

(56) References Cited

U.S. PATENT DOCUMENTS

| | | | |
|---|---|---|---|
| 2007/0227311 A1* | 10/2007 | Wang | B25B 13/06 81/125 |
| 2011/0056337 A1* | 3/2011 | Buchanan | B25B 23/108 81/124.5 |
| 2015/0020652 A1* | 1/2015 | Wong | B25B 23/0035 81/438 |
| 2015/0209946 A1* | 7/2015 | Scrivens | B25B 13/06 29/525.11 |
| 2018/0043515 A1* | 2/2018 | Zelniker | B25B 13/463 |
| 2018/0297182 A1* | 10/2018 | Barzelay | B25B 13/18 |
| 2018/0297183 A1* | 10/2018 | Barzelay | B25B 13/18 |
| 2019/0283220 A1* | 9/2019 | Blanchette | B25B 23/108 |

* cited by examiner

TIGHTENING DEVICE

CROSS-REFERENCE TO RELATED APPLICATIONS

This application claims the priority benefit of Japanese Patent Application No. 2020-064298, filed on Mar. 31, 2020. The entirety of the above-mentioned patent application is hereby incorporated by reference herein and made a part of this specification.

BACKGROUND

Technical Field

The disclosure relates to a tightening device.

Related Art

When an articulated robot or the like is used to automatically tighten a member to be tightened such as a bolt or the like to a work piece on which a bolt hole or the like is formed, the member to be tightened is temporarily held on a tightening device such as a socket or the like that is held by an end effector or the like by a magnetic force of a magnet or the like, and tightening work is performed after a position of the bolt hole or the like is detected by image processing or the like.

WO2019/150726 discloses a technique for estimating a position shift amount of a bolt with respect to a socket according to a change in a contact state of a socket of a nut runner which serves as an end effector with respect to the bolt, specifically, according to a contact force and a moment change thereof.

Nevertheless, when a bolt or the like is tightened, generally, a gap (margin) is arranged between the socket and the bolt in order to allow some position shift. However, although this gap is useful when the bolt is tightened, when a change in the contact state is detected by a sensor as in the technique disclosed in WO2019/150726, it becomes difficult to accurately capture the change in the contact state.

SUMMARY

The disclosure provides a tightening device capable of easily capturing a change in a contact state of a member to be tightened such as a bolt or the like and also reliably performing fastening.

A tightening device of the disclosure, which tightens a member to be tightened to a work piece in a state where a tightening member is engaged with the member to be tightened, includes: a holding member that holds the member to be tightened with respect to the tightening member; and fixing members that enable fixation to the tightening member in a fixed state where a binding force on the member to be tightened is larger than that in the held state by the holding member. The fixing member can maintain the fixed state before the tightening work of tightening the member to be tightened to the work piece is performed and release the fixed state after the tightening work is started.

According to the tightening device of the disclosure, because the fixed state is maintained in which the member to be tightened is fixed to the tightening member before the tightening work is performed, a change in the contact state of the member to be tightened with respect to the work piece can be accurately detected by a sensor or the like. In addition, because the fixed state can be released after the tightening work is started, the member to be tightened can be made to follow the work piece and be tightened to the work piece, and thus the fastening can be performed reliably.

In the tightening device of the disclosure, it is preferable that the fixing member releases the fixed state in conjunction with rotational power of the tightening member.

In this case, the fixed state is released in conjunction with the rotational power of the tightening member that can be given by the same power source as when the member to be tightened is tightened to the work piece, and thus a separate power source is not required.

DESCRIPTION OF THE EMBODIMENTS

Figure 1A:
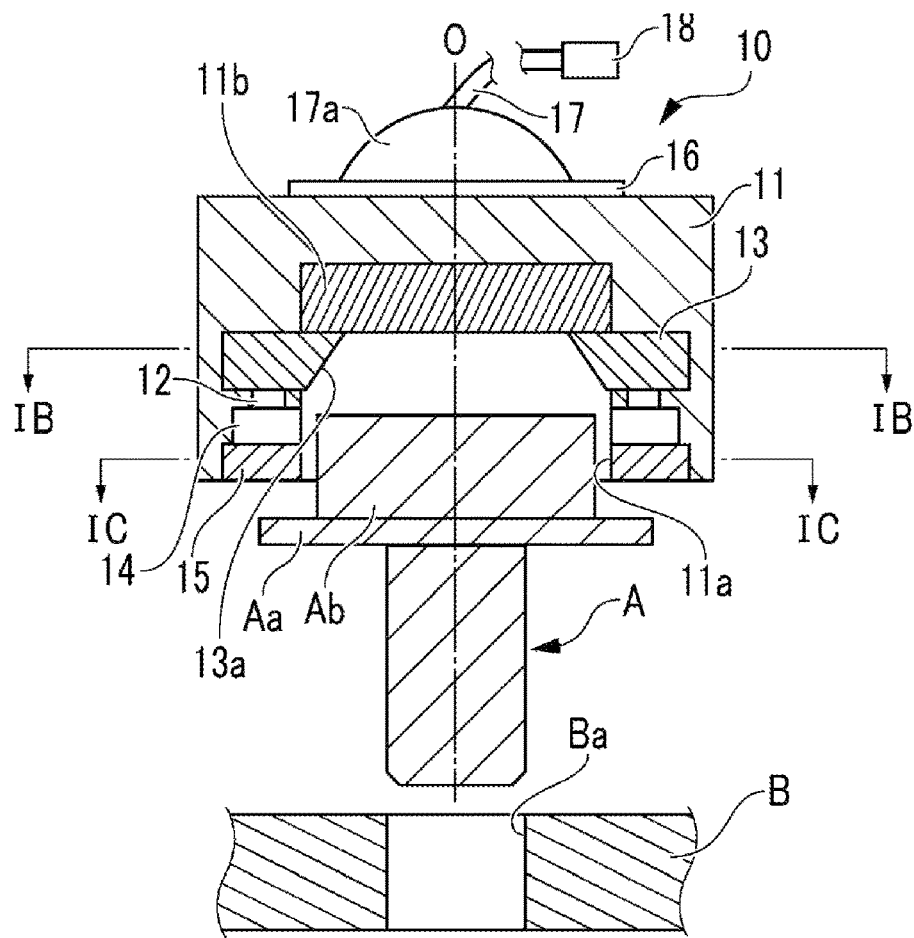
FIG. 1A is a schematic conceptual vertical cross-sectional view showing a state before tightening work of a tightening device according to a first embodiment of the disclosure.
Figure 1B:
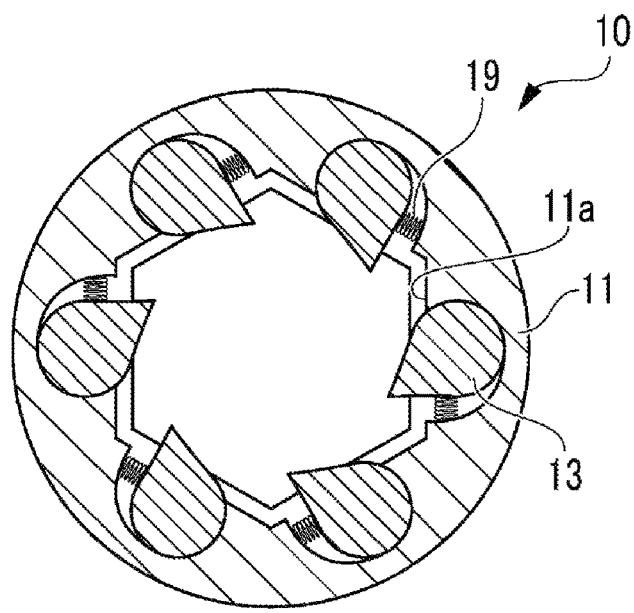
FIG. 1B is a cross-sectional view taken along a line B-B of FIG. 1A.
Figure 1C:
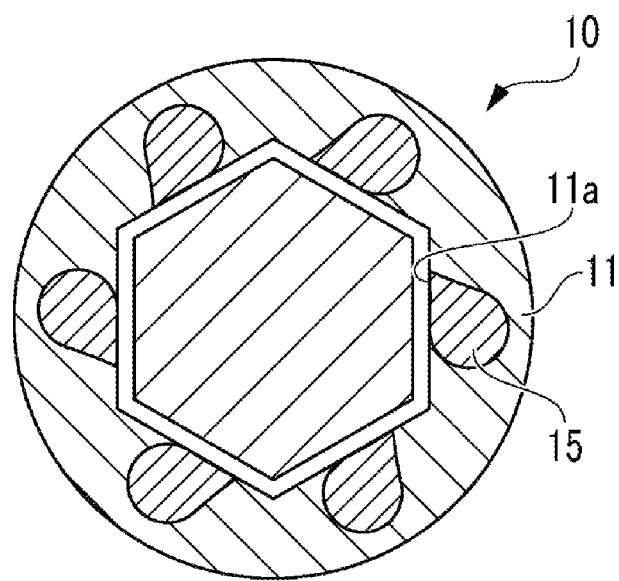
FIG. 1C is a cross-sectional view taken along a line C-C of FIG. 1A.
Figure 2A:
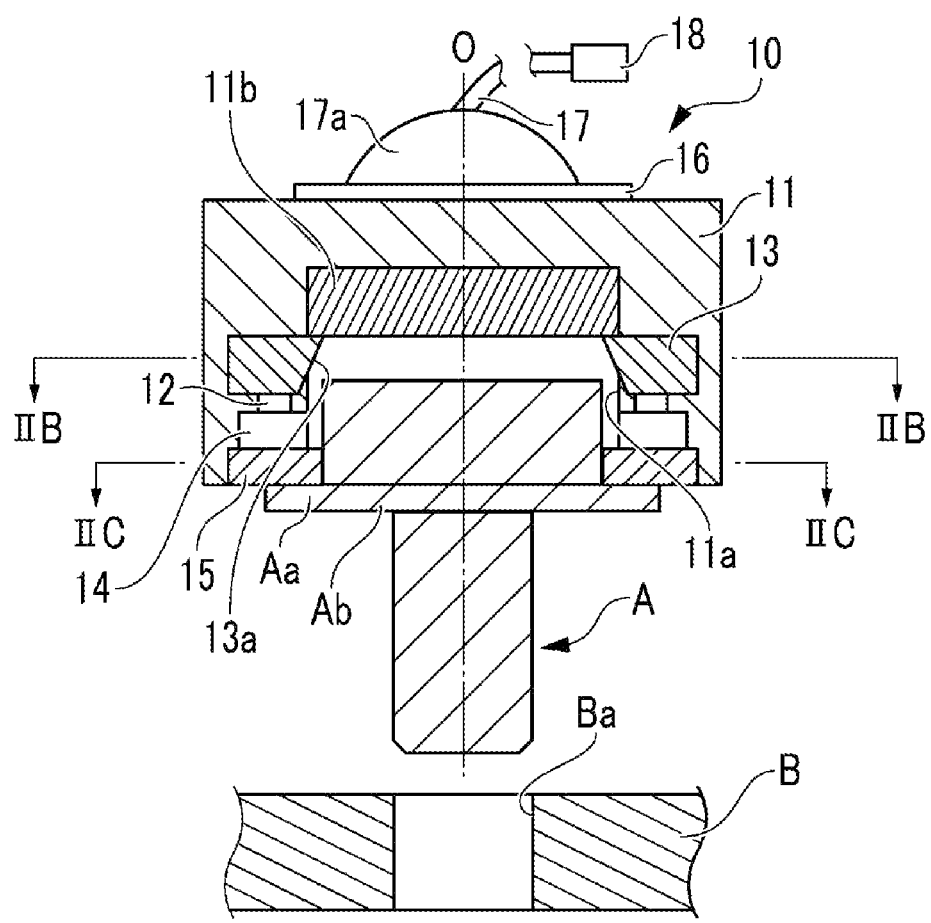
FIG. 2A is a schematic conceptual vertical cross section view showing a fixed state of the tightening device according to the first embodiment of the disclosure.
Figure 2B:
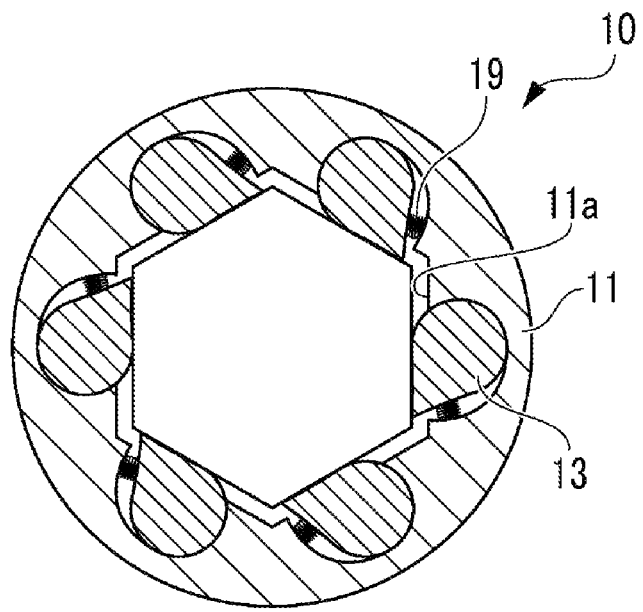
FIG. 2B is a cross-sectional view taken along a line B-B of FIG. 2A.
Figure 2C:
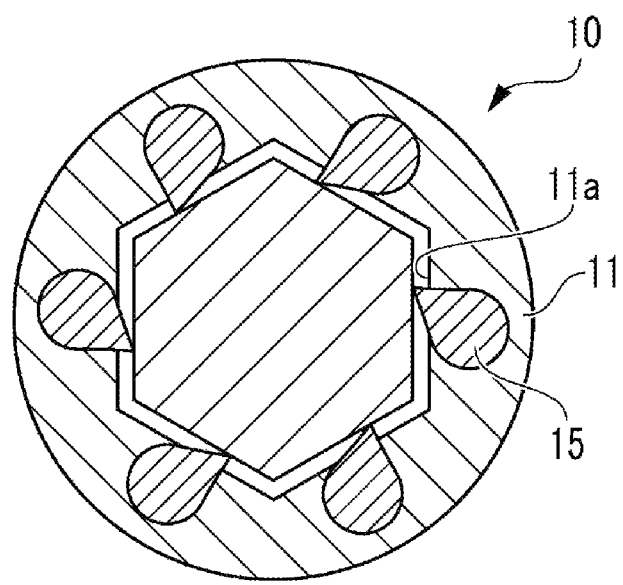
FIG. 2C is a cross-sectional view taken along a line C-C of FIG. 2A.

Hereinafter, a tightening device 10 according to a first embodiment of the disclosure is described with reference to FIGS. 1 and 2. Here, as an example, a case is described in which, by using the tightening device 10, a bolt A corresponding to a member to be tightened of the disclosure is screwed and tightened to a bolt hole Ba formed on an upper surface of a work piece B. The bolt A has a washer Aa and a hexagonal columnar bolt head Ab.

The tightening device 10 includes: a main body 11 corresponding to a tightening member of the disclosure; a plurality of rotating shafts 12 rotatably attached to the main body 11; upper cam members 13 attached to each upper portion of the plurality of rotating shafts 12; lower cam members 15 corresponding to fixing members of the disclosure attached to each lower portion of the plurality of rotating shafts 12 via one-way clutches 14; a sensor 16 that detects a contact state of the bolt A held by the tightening device 10 in a fixed state; a moving mechanism 17; and a control device (control portion) 18.

Although details are not shown, the main body 11 is attached to an end effector 17a such as a hand (grip portion) which is located at a distal end of the moving mechanism 17 such as an articulated robot or a hand tool. Besides, a bolt insertion hole 11a into which the substantially hexagonal columnar bolt head Ab of the bolt A can be inserted with a gap is formed on a lower surface of the main body 11. In addition, a portion in which the rotating shaft 12, the upper cam member 13, the one-way clutch 14, and the lower cam member 15 are accommodated is formed in the main body 11. In addition, a magnet 11b corresponding to a holding member of the disclosure is arranged above the bolt insertion hole 11a of the main body 11.

Six rotating shafts 12 are respectively arranged to be rotatable with respect to the main body 11 around the outer side of the bolt insertion hole 11a in a way of being equal around a central axis O of the main body 11.

The upper cam member 13 is attached to the upper portion of each rotating shaft 12. Each upper cam member 13 has the same shape, and one end of the upper cam member 13 has a protruding cam shape. This cam shape is arranged point-symmetrically at the same angle with respect to the central axis O. Besides, a lower surface 13a of each upper cam member 13 is formed in a way of inclining downward from the central axis O toward the outside.

Each upper cam member 13 is biased to rotate clockwise when viewed from the above by a biasing member (spring) 19 which is arranged in a hole formed in the main body 11.

The one-way clutch 14 is attached to the lower portion of each rotating shaft 12.

The lower cam member 15 is attached to the lower portion of each one-way clutch 14. Each lower cam member 15 has the same shape, and one end of the lower cam member 15 has a protruding cam shape. This cam shape is arranged point-symmetrically at the same angle with respect to the central axis O. Besides, by an action of the one-way clutch 14, each lower cam member 15 rotate clockwise freely when viewed from the above with respect to the upper cam member 13 and the rotating shaft 12, but cannot rotate counterclockwise.

In a state where each upper cam member 13 is biased by the spring 19, each lower cam member 15 is in a state of being retracted in an outer peripheral direction from the central axis O with respect to the bolt insertion hole 11a. When each upper cam member 13 rotates counterclockwise when viewed from the above against the bias by the spring 19, each lower cam member 15 also rotates counterclockwise similarly and enters inward toward the central axis O with respect to the bolt insertion hole 11a.

The sensor 16 is arranged between the end effector 17a and the main body 11. Here, the sensor 16 is a six-axis contact sensor capable of detecting forces in three directions and moments in three directions. The sensor 16 transmits a detection result of the detected six-axis component to a control portion 18.

The control portion 18 estimates a shift amount of the tightening device 10 with respect to the work piece B based on a change in the contact state of the tightening device 10 with respect to the work piece B that is detected by the sensor 16. More specifically, the moving mechanism 17 is controlled in a state in which the bolt A is held in the fixed state of being fixed to the tightening device 10 by the lower cam member 15, a time change in the contact state when the contact state between the bolt A and the work piece B is changed is detected by the sensor 16, and the shift amount is estimated based on the time change in the contact state detected by the sensor 16 and a result obtained by learning in advance by machine learning or the like. Then, the position shift of the tightening device 10 is adjusted by controlling the moving mechanism 17, and work of tightening to the work piece B is performed after this adjustment. Moreover, a method disclosed in WO 2019/150726 or the like may be used as a method of the machine learning, and detailed description thereof is omitted.

Hereinafter, a method is described in which by using the tightening device 10 described above, the bolt A is screwed and tightened to the bolt hole Ba formed on the upper surface of the work piece B. Each portion of the tightening device 10 and each portion of the moving mechanism 17 are controlled by the control portion 18 with this method.

In an initial state before the bolt A is held by the tightening device 10, a protruding portion of each upper cam member 13 is in a protruding state of protruding into the bolt insertion hole 11a due to a biasing force of the spring 19. Then, accordingly, a protruding portion of each lower cam member 15 is in a retracted state of being retracted from the bolt insertion hole 11a.

In the initial state, first, the moving mechanism 17 is controlled to lower the tightening device 10 from the top to the bottom of the bolt head Ab of the bolt A, and the bolt head Ab is inserted into the bolt insertion hole 11a. At the start of insertion, the bolt head Ab does not come into contact with the lower cam member 15.

Then, when the bolt head Ab is further inserted deep into the bolt insertion hole 11a, the bolt head Ab comes into contact with the lower surface 13a of the upper cam member 13, and the upper cam member 13 gradually rotates counterclockwise when viewed from the above along with the insertion of the bolt head Ab. At this time, the lower cam member 15 also rotates in the same manner along with the rotation of the upper cam member 13, the protruding portion of the lower cam member 15 enters the bolt insertion hole 11a and comes into contact with the outer peripheral surface of the bolt head Ab, and the bolt head Ab is in a fixed state due to this contact. In addition, at this time, the bolt head Ab is also held on the main body 11 by a magnetic force of the magnet 11b.

Then, in the state in which the bolt head Ab is fixed to the main body 11, the tightening device 10 is moved by the moving mechanism 17 to come into contact with the work piece B. Next, a change in the contact state of the tightening device 10 with respect to the work piece B is detected by the sensor 16, the shift amount of the tightening device 10 with respect to the work piece B is estimated based on the change in the contact state detected by the sensor 16, and the shift amount is corrected by controlling the moving mechanism 17.

Next, in the state in which the shift amount is corrected, the bolt A is screwed and tightened to the bolt hole Ba of the work piece B. In this tightening work, the tightening device 10 is rotated clockwise when viewed from the above. At this time, the lower cam member 15 does not hinder the rotation of the bolt A by the action of the one-way clutch 14. Thereby, the bolt A is held on the main body 11 by the action of only the magnet 11b, and thus the bolt A can be made to satisfactorily follow the bolt hole Ba and be tightened to the bolt hole Ba.

Then, after the work of tightening the bolt A to the bolt hole Ba is completed, because the holding force of the magnet 11b is small, the tightening device 10 is moved upward by the moving mechanism 17, and thereby the holding of the bolt A performed by the tightening device 10 is released. Thereby, the tightening work is completed.

Figure 3:
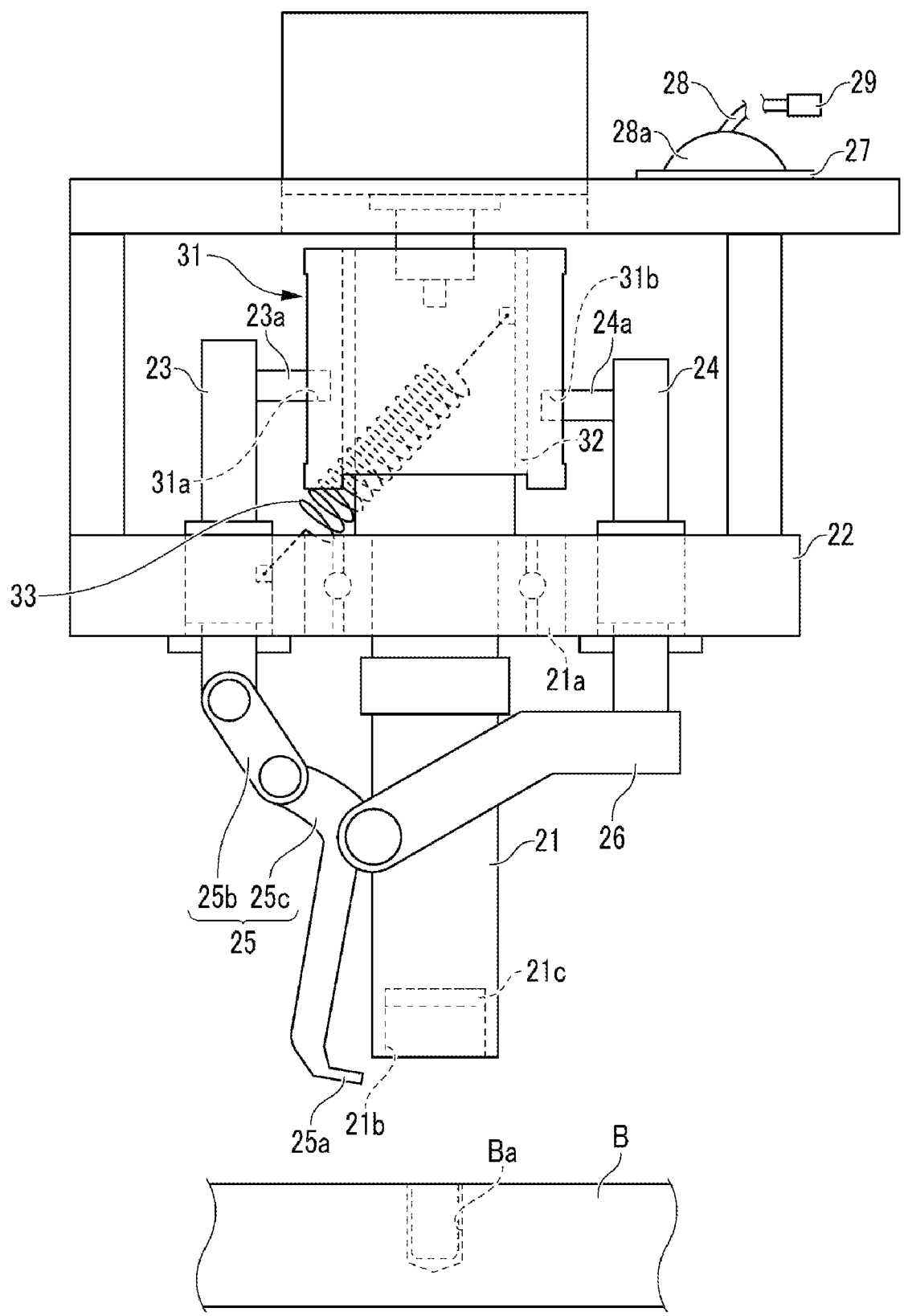
FIG. 3 is a schematic conceptual diagram showing a state before tightening work of a tightening device according to a second embodiment of the disclosure.
Figure 4:
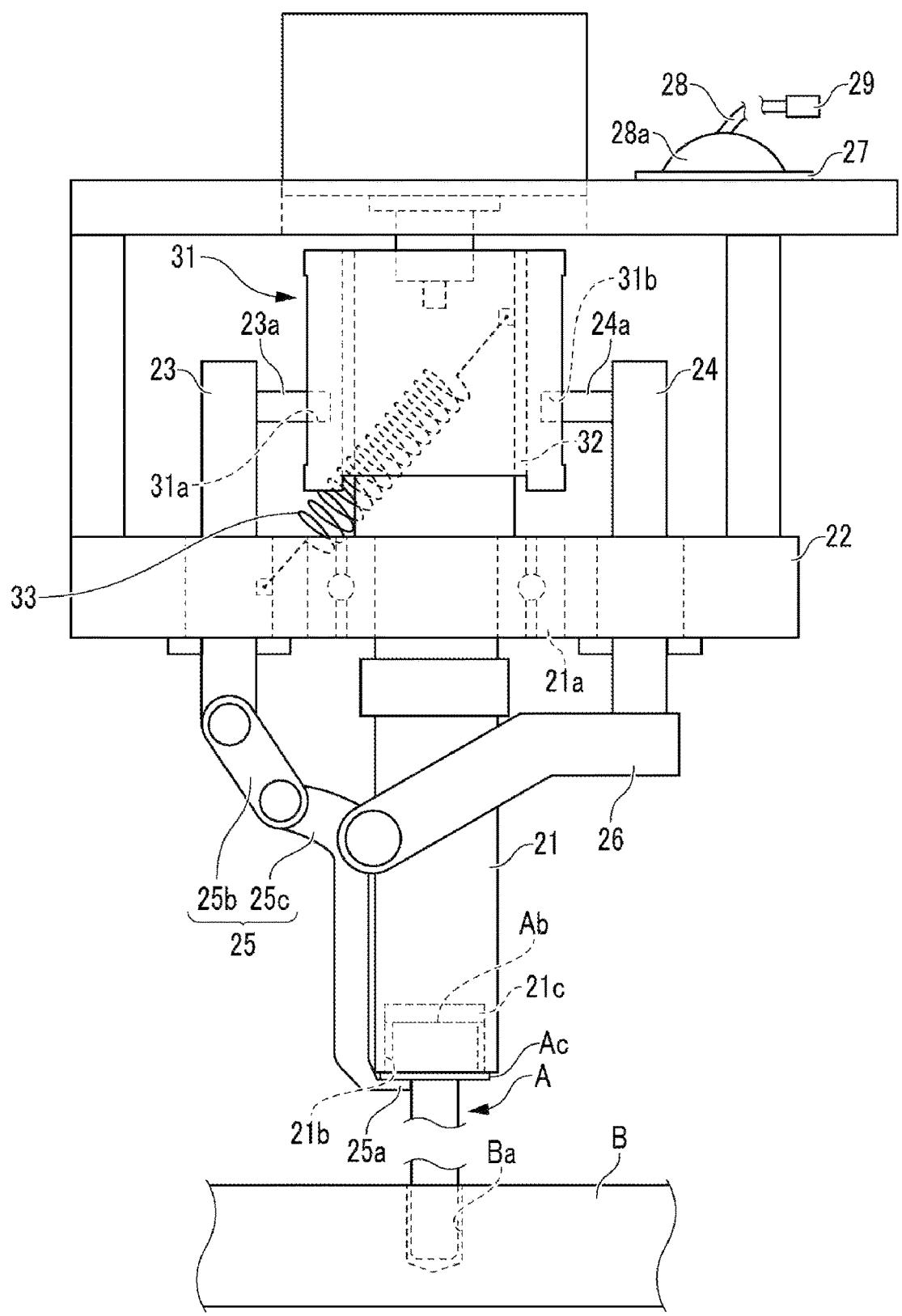
FIG. 4 is a schematic conceptual diagram showing a fixed state of the tightening device according to the second embodiment of the disclosure.

Hereinafter, a tightening device 20 according to a second embodiment of the disclosure is described with reference to FIGS. 3 and 4. Here, as an example, a case is described in which, by using the tightening device 20, the bolt A is screwed and tightened to the bolt hole Ba formed on the upper surface of the work piece B. The bolt A has the washer Aa and the hexagonal columnar bolt head Ab.

The tightening device 20 includes: a first main body 21; a second main body 22 attached to the first main body 21 via a bearing 21a; a first vertical moving body 23 that moves up and down with respect to the second main body 22 along with rotation of the first main body 21 on one side of the first main body 21; a second vertical moving body 24 that moves up and down with respect to the second main body 22 along with the rotation of the first main body 21 on the other side of the first main body 21; a link body 25 that connects the lower portion of the first vertical moving body 23 and the first main body 21, and has a clamp portion (claw portion) 25a corresponding to the fixing member of the disclosure at the lower portion; a linear moving body 26 that connects the lower portion of the second vertical moving body 24 and the link body 25; a sensor 27; a moving mechanism 28; and a control portion 29.

A bolt insertion hole 21b into which the substantially hexagonal columnar bolt head Ab of the bolt A can be inserted with a gap is formed on a lower surface of the first main body 21. In addition, a magnet 21c corresponding to the holding member of the disclosure is arranged above the bolt insertion hole 21b of the first main body 21.

The second main body 22 is fixed to an outer ring of the bearing 21a in which the first main body 21 is fixed to an inner ring. Thereby, even if the first main body 21 rotates, the second main body 22 does not rotate. Besides, a cam 31 is attached to the first main body 21 via a one-way clutch 32. When the first main body 21 is rotated clockwise when viewed from the above by the action of the one-way clutch 32, the cam 31 does not rotate even if the first main body 21 rotates.

When the first main body 21 is rotated counterclockwise when viewed from the above, the cam 31 rotates along with the rotation of the first main body 21. Cam holes 31a and 31b are formed on both side walls of the cam 31. These cam holes 31a and 31b have different shapes (cam profiles). In addition, an elastic member 33 is attached in a way of connecting a side surface of the cam 31 and the second main body 22. Thereby, the cam 31 must be moved against an elastic force when rotating counterclockwise, and returns to the original position when the rotational force disappears.

The first vertical moving body 23 is equipped with a pin 23a that is inserted into a cam hole 31a formed on one side wall of the cam 31, and is configured to move up and down with respect to the first main body 21 along with the rotation of the first main body 21.

The second vertical moving body 24 is equipped with a pin 24a that is inserted into a cam hole 31b formed on the other side wall of the cam 31, and is configured to move up and down with respect to the first main body 21 along with the rotation of the first main body 21. Moreover, the shapes of the cam holes 31a and 31b are specified in order that a stroke of the first vertical moving body 23 is longer than that of the second vertical moving body 24 when the first main body 21 is rotated by the same angle.

The link body 25 is configured by a first link 25b of which one end is rotatably supported by the lower portion of the first vertical moving body 23, and a second link 25c of which one end is rotatably supported by the other end of the first link 25b and a middle portion is rotatably supported by the first main body 21.

Besides, in the second link 25c, a clamp portion 25a is formed at the other end thereof, which can come into contact with a lower surface of the washer Aa of the bolt A to fix the bolt A. Moreover, in the embodiment, the clamp portion 25a is in contact with the lower surface of the washer Aa to fix the bolt A, but when the washer Aa does not exist, the clamp portion 25a may come into contact with a flange surface of the bolt A to fix the bolt A.

One end of the linear moving body 26 is fixed to the lower portion of the second vertical moving body 24, and the other end is rotatably supported by the lower portion of the first main body 21 together with the middle portion of the second link 25c.

The sensor 27 is arranged between the end effector 28a and the first main body 21. Here, the sensor 27 is a six-axis contact sensor capable of detecting forces in three directions and moments in three directions. The sensor 27 transmits a detection result of the detected six-axis component to the control portion 29.

The control portion 29 estimates a shift amount of the tightening device 20 with respect to the work piece B based on a change in the contact state of the tightening device 20 with respect to the work piece B that is detected by the sensor 27. More specifically, when the moving mechanism 28 is controlled in a state in which the bolt A is held in the fixed state of being fixed to the tightening device 20 by the clamp portion 25a, a time change in the contact state when the contact state between the bolt A and the work piece B is changed is detected by the sensor 27, and the shift amount is estimated based on the time change in the contact state detected by the sensor 27 and a result obtained by learning in advance by machine learning or the like. Then, the position shift of the tightening device 20 is adjusted by controlling the moving mechanism 28, and work of tightening to the work piece B is performed after this adjustment. Moreover, the method disclosed in the literature mentioned in the first embodiment or the like may be used as a method of the machine learning, and detailed description thereof is omitted.

Hereinafter, a method is described in which by using the tightening device 20 described above, the bolt A is screwed and tightened to the bolt hole Ba formed on the upper surface of the work piece B. Each portion of the tightening device 20 is controlled by the control portion 29 with this method.

In an initial state before the bolt A is held by the tightening device 20, the first and second vertical moving bodies 23 and 24 are located on the upper side, and the clamp portion 25a is in a retracted state of being retracted laterally from the bolt insertion hole 21b.

In the initial state, first, the moving mechanism 28 is controlled to lower the tightening device 20 from the top to the bottom of the bolt head Ab of the bolt A, and the bolt head Ab is inserted into the bolt insertion hole 21b of the first main body 21. In addition, at this time, the bolt head Ab is also held on the first main body 21 by a magnetic force of the magnet 21c.

Then, after the bolt head Ab is inserted into the deep of the bolt insertion hole 21b, the first main body 21 is controlled to rotate the first main body 21 counterclockwise, for example, by half a turn. At this time, the cam 31 also rotates along with the rotation of the first main body 21. Thereby, the cam 31 rotates against the elastic force of the elastic member 33, the pins 23a and 24a respectively move in the cam holes 31a and 31b, the link body 25 and the linear moving body 26 change in a rotatable state at connection portions thereof, and the clamp portion 25a presses, from the lateral lower side, the washer Aa of the bolt A that is inserted into the bolt insertion hole 21b. Thereby, the bolt A is in a fixed state of being fixed in the bolt insertion hole 21b.

Then, in the state in which the bolt head Ab is fixed to the first main body 21, the tightening device 20 is moved by the moving mechanism 28 to come into contact with the work piece B. Next, a change in the contact state of the tightening device 20 with respect to the work piece B is detected by the sensor 27, the shift amount of the tightening device 20 with respect to the work piece B is estimated based on the change in the contact state detected by the sensor 27, and the shift amount is corrected by controlling the moving mechanism 28.

Next, in the state in which the shift amount is corrected, the bolt A is screwed and tightened to the bolt hole Ba of the work piece B. In this tightening work, the first main body 21 is rotated clockwise when viewed from the above. At this time, first, only the cam 31 is rotated by the elastic force of the elastic member 33, and the fixation of the bolt A performed by the clamp portion 25a is released. Furthermore, when the first main body 21 is rotated clockwise when viewed from the above, the first main body 21 rotates with respect to the second main body 22. Thereby, because the bolt A is held on the first main body 21 by the magnet 21c, the bolt A can be made to satisfactorily follow the bolt hole Ba and be tightened to the bolt hole Ba.

Then, after the work of tightening the bolt A to the bolt hole Ba is completed, because the holding force of the magnet 21c is small, the tightening device 20 is moved upward by the moving mechanism 28, and thereby the holding of the bolt A performed by the tightening device 20 is released. Thereby, the tightening work is completed.

As described above, the bolt A is maintained in the fixed state of being fixed to the main body 11 or the first main body 21 before the tightening work is performed, and thus the change in the contact state of the bolt A with respect to the work piece B can be accurately detected by the sensors 16 and 27. In addition, because the fixed state is released after the tightening work is started, the bolt A can be made to follow the work piece B and be tightened to the work piece B, and thus the bolt A can be reliably fastened.

Although the embodiments of the disclosure have been described above, the disclosure is not limited to hereto, and the configurations, forms, and the like of the tightening devices 10 and 20 and the bolt A and the work piece B on which the tightening work is performed can be appropriately changed.

What is claimed is:

1. A tightening device, configured to tighten a member to be tightened to a work piece in a state where a tightening member is engaged with the member to be tightened, comprising:
    an insertion hole formed in the tightening member for engaging with the member to the tightened;
    a holding member that holds the member to be tightened with respect to the tightening member; and
    at least one fixing member that enables fixation in a fixed state where a binding force on the member to be tightened is larger than that a holding force of holding the member to be tightened by the holding member;
    a sensor that detects a contact state between the member to be tightened and the workpiece in the fixed state; and
    a controller that controls movements of the tightening device and estimates a shift amount of the tightening device with respect to the work piece based on a change in the contact state between the member to be tightened and the work piece that is detected by the sensor,
    wherein the at least one fixing member is capable of maintaining the fixed state before a tightening work of tightening the member to be tightened to the work piece is performed and releasing the fixed state once the tightening work is started, and
    during the tightening work, the member to be tightened is held by the holding member and the tightening member rotates in a tightening direction to release the member to be tightened from the fixed state of the at least one fixing member.

* * * * *